US 8,095,526 B2

(12) United States Patent
Motoki

(10) Patent No.: US 8,095,526 B2
(45) Date of Patent: Jan. 10, 2012

(54) EFFICIENT RETRIEVAL OF VARIABLE-LENGTH CHARACTER STRING DATA

(75) Inventor: Akihiro Motoki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/965,602

(22) Filed: Dec. 10, 2010

(65) Prior Publication Data

US 2011/0078153 A1 Mar. 31, 2011

Related U.S. Application Data

(62) Division of application No. 11/000,913, filed on Dec. 2, 2004, now abandoned.

(30) Foreign Application Priority Data

Dec. 2, 2003 (JP) .................................. 2003-402741

(51) Int. Cl.
*G06F 7/00* (2006.01)
*G06F 17/30* (2006.01)

(52) U.S. Cl. ........ 707/705; 707/736; 707/744; 707/748; 707/999.006; 704/221

(58) Field of Classification Search .................. 707/673, 707/705, 736, 744–748
See application file for complete search history.

(56) References Cited

U.S. PATENT DOCUMENTS

| 5,136,289 | A | 8/1992 | Yoshida et al. |
| 6,151,565 | A * | 11/2000 | Lobley et al. ..................... 703/2 |
| 6,169,999 | B1 | 1/2001 | Kanno |
| 6,493,713 | B1 | 12/2002 | Kanno |
| 6,785,677 | B1 | 8/2004 | Fritchman |
| 6,829,602 | B2 | 12/2004 | Avadhanam et al. |
| 6,910,097 | B1 * | 6/2005 | Srinivasan et al. ............ 711/108 |

(Continued)

FOREIGN PATENT DOCUMENTS

| JP | 04-209069 A | 7/1992 |
| JP | 06-162092 A | 6/1994 |
| JP | 07-319888 A | 12/1995 |

(Continued)

OTHER PUBLICATIONS

Martin Cohn, et al. "Parsing with Suffix and Prefix Dictionaries", Computer Science Department, IEEE Computer Society. In Proceedings of the Conference on Data Compression, 1996, pp. 180-189.

*Primary Examiner* — Mohammad Ali
*Assistant Examiner* — Angelica Ruiz
(74) *Attorney, Agent, or Firm* — Sughrue Mion, PLLC

(57) ABSTRACT

Prefixes are registered on a first list as index elements for respective registration patterns. Each prefix is selected as the longest of different-length prefixes that are extractable from a registration pattern in accordance with an extraction rule. Suffixes, which are the remaining parts of the registration patterns excluding the respective prefixes, are registered on a second list. Using different-length prefixes that are extracted from a retrieval key in accordance with the extraction rule, a prefix retriever searches the first list to retrieve a registration pattern whose prefix matches any of the prefixes of the retrieval key. A suffix checker carries out a check on the suffix of the registration pattern retrieved by the prefix retriever, among the suffixes on the second list, as to whether the suffix of the registration pattern matches the suffix of the retrieval key.

9 Claims, 11 Drawing Sheets

U.S. PATENT DOCUMENTS

| | | |
|---|---|---|
| 7,177,313 B2 | 2/2007 | Davis et al. |
| 2002/0040866 A1 | 4/2002 | Tuneld et al. |
| 2002/0064311 A1* | 5/2002 | Yahagi .......................... 382/224 |
| 2002/0077995 A1* | 6/2002 | Allison et al. .................... 707/1 |
| 2003/0229636 A1* | 12/2003 | Mattausch et al. ................ 707/6 |

FOREIGN PATENT DOCUMENTS

| | | |
|---|---|---|
| JP | 11-316764 A | 11/1999 |
| JP | 2000-029879 A | 1/2000 |
| JP | 2002-049645 A | 2/2002 |
| JP | 2002-297660 A | 10/2002 |

* cited by examiner

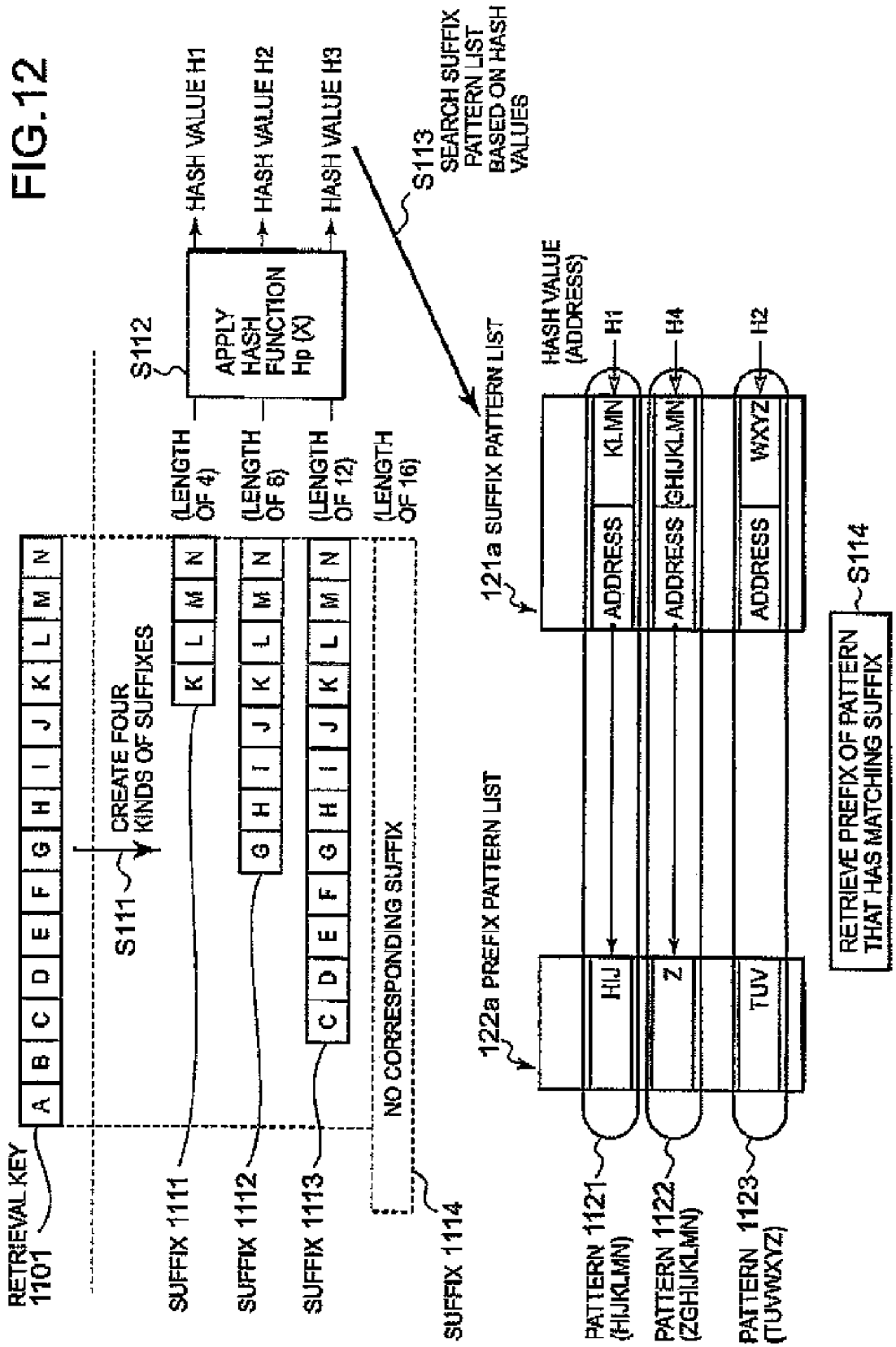

EFFICIENT RETRIEVAL OF VARIABLE-LENGTH CHARACTER STRING DATA

CROSS REFERENCE TO RELATED APPLICATIONS

This application is a divisional of U.S. patent application Ser. No. 11/000,913, filed Dec. 2, 2004 which claims priority to Japanese Patent Application No. 2003-402741, filed Dec. 2, 2003, the contents of all of which are incorporated herein by reference.

BACKGROUND OF THE INVENTION

1. Field of the Invention

The present invention relates to an information retrieval technology of retrieving variable-length character string data. More particularly, the present invention relates to a technology to enhance efficiency in retrieving the longest prefix match or longest suffix match of a variable-length character string.

2. Description of the Related Art

First of all, a description will be given of a general outline of the retrieval of the longest prefix match, which is the primary application target of the present invention. In the retrieval of the longest prefix match, a retrieval result is, in a pattern list, the longest of patterns that match leading characters of a retrieval key (character string to retrieve). For example, when there are three patterns "ABCD", "ABCDEFGH" and "ABODE" that match leading characters of a retrieval key (e.g., "ABCDEFGHIJ"), the longest matching pattern "ABCDEFGH" is outputted as a retrieval result. At this time, if a pattern is longer than the retrieval key, it does not matter what character string the pattern has in the part exceeding the pattern of the retrieval key. On the other hand, a pattern that does not match leading characters of the retrieval key, such as a pattern "BODE", does not meet a condition of prefix matching, even if the pattern is a partial character string of the retrieval key.

In a system performing retrieval of information concerning variable-length character string data, in particular, retrieval of a prefix match or suffix match of a variable-length character string, a technology as described below is conventionally known as a method for fast retrieval of a pattern that matches a retrieval key among a large number of patterns.

Japanese Unexamined Patent Application Publication No. H04-209069, for example, describes a prior art concerning the retrieval of a prefix match, where index creating means and data retrieving means are provided. The index creating means creates an index table based on first n characters (n: natural number) of character string data. The data retrieving means searches the index table to extract character strings whose prefixes match a retrieval condition. In the data retrieving means, when a character string designated as the retrieval condition is longer than the character strings of index data, each character in the remaining parts of the extracted character string data is compared with the retrieval condition, thereby retrieving a character string that matches the retrieval condition.

Such a prior art has a disadvantage, which will be described with reference to FIG. 1. In the prior art, the index data are created from first n characters of the character string data. In the case of searching a list where only patterns 1301 to 1304 are registered, five leading characters (to the left of a separation 1351) of each of the patterns 1301 to 1304 are set as an index because four leading characters thereof are common. Thus, the registered patterns can be efficiently narrowed based on the indexes. Similarly, in the case of searching patterns consisting of only patterns 1305 to 1310, ten leading characters (to the left of a separation 1352) of each pattern are set as an index because the patterns 1305 to 1310 have nine common leading characters.

A problem arises, however, in the case of a search target including both the patterns 1301 to 1304 and the patterns 1305 to 1301. Specifically, to efficiently narrow the patterns 1301 to 1304, it is desirable to set the five leading characters as an index, in which case, however, the patterns 1305 to 1310 will all have the same indexes. Therefore, if a character string starting with "PQRSPQRSP" is inputted as a retrieval key, the narrowing of the patterns 1305 to 1310 based on the indexes is insufficient, leading to increased costs of suffix-part comparison to be performed thereafter, lowering the retrieval efficiency. As described above, the prior art has a problem that, when the overlapping parts of registration patterns vary in length, the registration patterns are not narrowed sufficiently based on indexes, resulting in the costs of comparing the remaining parts of the character strings becoming large.

SUMMARY OF THE INVENTION

Accordingly, an object of the present invention is to provide an information retrieval technique, which achieves high retrieval efficiency even when the overlapping parts of registration patterns have a variety of lengths.

According to a first aspect of the present invention, an index element for a registration pattern is generated, wherein the index element is a partial string of characters which is selected from a plurality of possible partial strings of characters according to a predetermined selection rule, wherein the plurality of possible partial strings of characters are extracted from the registration pattern according to a predetermined extraction rule. An index element for a given retrieval key is retrieved using a plurality of partial strings of characters with different lengths that are extracted from the given retrieval key according to the predetermined extraction rule, to narrow scope of retrieval.

As described above, according to the present invention, high retrieval efficiency can be achieved even when the overlapping parts of registration patterns vary in length.

More specifically, for each registration pattern, an index element is made of a partial character string (e.g., the longest partial character string) of the registration pattern, selected in accordance with the selection rule among partial character strings of the registration pattern that are extractable from the registration pattern in accordance with the extraction rule.

Therefore, it is possible to reduce the probability that the index elements of registration patterns will be the same. Consequently, it is possible to enhance the efficiency in narrowing the registration patterns through index retrieval, and thus to reduce the costs of subsequently performed checking processing for comparing the parts other than the index elements of a retrieval key and of the registration patterns.

In addition, when the longest partial character string is set as an index element, the number of characters to be compared in the above-mentioned checking processing becomes smaller. Therefore, the retrieval efficiency can be further enhanced.

According to a second aspect of the present invention, an apparatus for retrieving a variable-length string of characters from a plurality of registration patterns, includes: a pattern storage section for registering the plurality of registration patterns and index elements for respective ones of the plurality of registration patterns, wherein each of the index elements for a corresponding registration pattern is a partial string of characters which is selected from a plurality of possible partial strings of characters according to a predetermined selection rule, wherein the plurality of possible partial strings of characters are extracted from the corresponding registration pattern according to a predetermined extraction rule; and a retrieval execution section for retrieving an index element for a given retrieval key using a plurality of partial strings of characters with different lengths that are extracted from the given retrieval key according to the predetermined extraction rule, to narrow scope of retrieval.

A method according to the second aspect of the present invention includes:

at registration pattern registration, extracting a plurality of possible partial strings of characters from each of the plurality of registration patterns according to a predetermined extraction rule; selecting a partial string of characters as an index element for a corresponding registration pattern from the plurality of possible partial strings of characters according to a predetermined selection rule; registering the plurality of registration patterns and index elements for respective ones of the plurality of registration patterns in a pattern storage section;

at registration pattern retrieval, extracting a plurality of partial strings of characters with different lengths from a given retrieval key according to the predetermined extraction rule; and searching the pattern storage section using the plurality of partial strings of characters extracted from the given retrieval key to narrow a search.

As described above, according to the present invention, high retrieval efficiency can be achieved even when the overlapping parts of registration patterns vary in length.

According to a third aspect of the present invention, an apparatus for retrieving a variable-length string of characters from a plurality of registration patterns, includes: a pattern storage section for registering the plurality of registration patterns and index elements for respective ones of the plurality of registration patterns, wherein each of the index elements for a corresponding registration pattern is a longest one of a plurality of possible registration pattern prefixes which are extracted from the corresponding registration pattern according to a predetermined extraction rule; and a retrieval execution section for retrieving an index element for a given retrieval key using a plurality of retrieval key prefixes with different lengths that are extracted from the given retrieval key according to the predetermined extraction rule, to narrow scope of retrieval.

A method according to the third aspect of the present invention includes:

at registration pattern registration, extracting a plurality of possible registration pattern prefixes with different lengths from a front end of a corresponding registration pattern from each of the plurality of registration patterns according to a predetermined extraction rule; selecting a longest possible registration pattern prefix as an index element for a corresponding registration pattern from the plurality of possible registration pattern prefixes according to a predetermined selection rule; registering the plurality of registration patterns and index elements for respective ones of the plurality of registration patterns in a pattern storage section;

at registration pattern retrieval, extracting a plurality of retrieval key prefixes with different lengths from a given retrieval key according to the predetermined extraction rule; and searching the pattern storage section using the plurality of retrieval key prefixes with different lengths to narrow a search.

As described above, according to the present invention, the efficiency in retrieval of a longest prefix match can be enhanced even when the overlapping parts of registration patterns vary in length.

According to a fourth aspect of the present invention, an apparatus for retrieving a variable-length string of characters from a plurality of registration patterns, includes: a pattern storage section for registering the plurality of registration patterns and index elements for respective ones of the plurality of registration patterns, wherein each of the index elements for a corresponding registration pattern is a longest one of a plurality of possible registration pattern suffixes with different lengths from a tail end of the corresponding registration pattern, wherein the plurality of possible registration pattern suffixes are extracted from the corresponding registration pattern according to a predetermined extraction rule; and a retrieval execution section for retrieving an index element for a given retrieval key using a plurality of retrieval key suffixes with different lengths that are extracted from the given retrieval key according to the predetermined extraction rule, to narrow scope of retrieval.

A method according to the fourth aspect of the present invention includes:

at registration pattern registration, extracting a plurality of possible registration pattern suffixes with different lengths from a tail end of a corresponding registration pattern from each of the plurality of registration patterns according to a predetermined extraction rule; selecting a longest possible registration pattern suffix as an index element for a corresponding registration pattern from the plurality of possible registration pattern suffixes according to a predetermined selection rule; registering the plurality of registration patterns and index elements for respective ones of the plurality of registration patterns in a pattern storage section;

at registration pattern retrieval, extracting a plurality of retrieval key suffixes with different lengths from a given retrieval key according to the predetermined extraction rule; and searching the pattern storage section using the plurality of retrieval key suffixes with different lengths to narrow a search.

In an embodiment, a prefix to be an index element stored at a location according to a hash value obtained by applying a hash function to the prefix. Therefore, the efficiency in retrieval of a longest prefix match can be further enhanced.

In another embodiment, a plurality of prefixes to be extracted are designated based on the number of characters of a registration pattern from its head or based on a separating character. Accordingly, it can flexibly apply to a variety of uses. For example, when the plurality of prefixes to be extracted are designated based on a separating character "/", it is possible to enhance the retrieval efficiency when retrieving the URL of a WWW page on the Internet.

BRIEF DESCRIPTION OF THE DRAWINGS

FIG. 12 is a diagram for describing an operation according the third embodiment.

DETAILED DESCRIPTION OF THE PREFERRED EMBODIMENTS

In the description, individual characters constituting a variable-length character string are not limited only to human-recognizable characters but may be binary data. In addition, there is no limit to the number of bits necessary to represent one character: the number of bits is not necessarily one byte (that is, the number of bits may be one bit or may be two bytes.)

1. First Embodiment

1.1) Configuration

Figure 1:
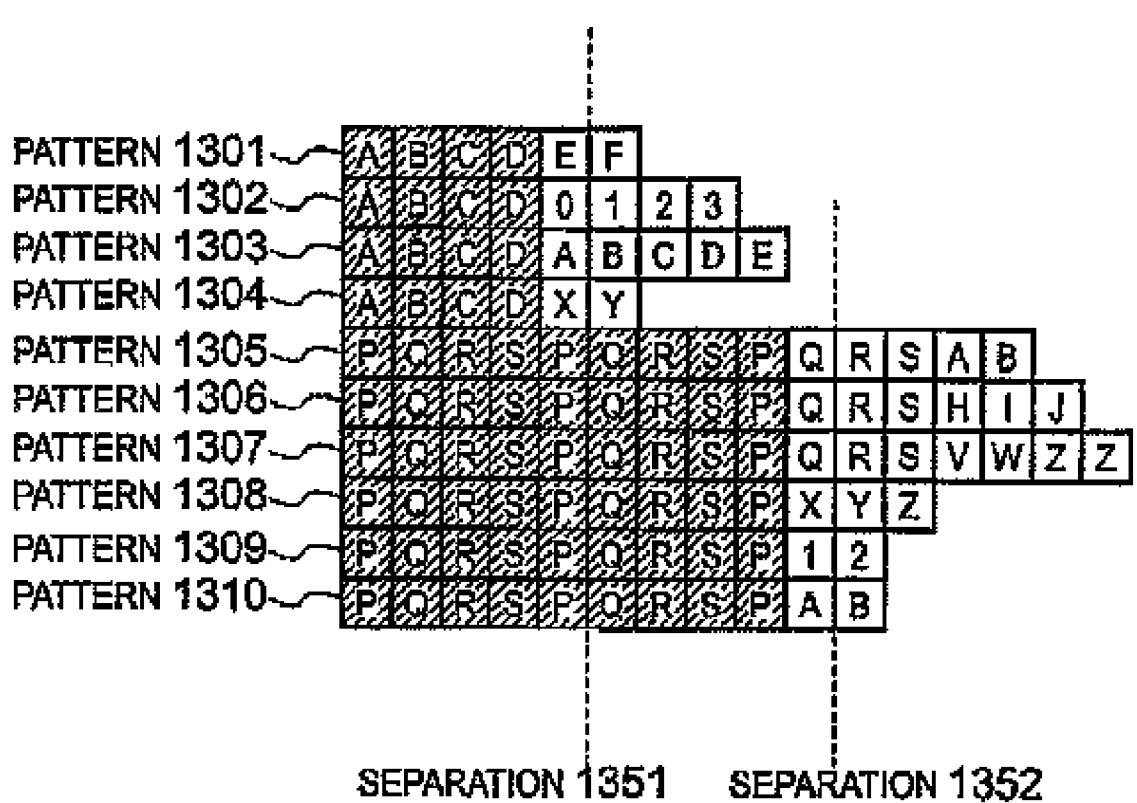
FIG. 1 is a diagram for describing a problem of a prior art.
Figure 2:
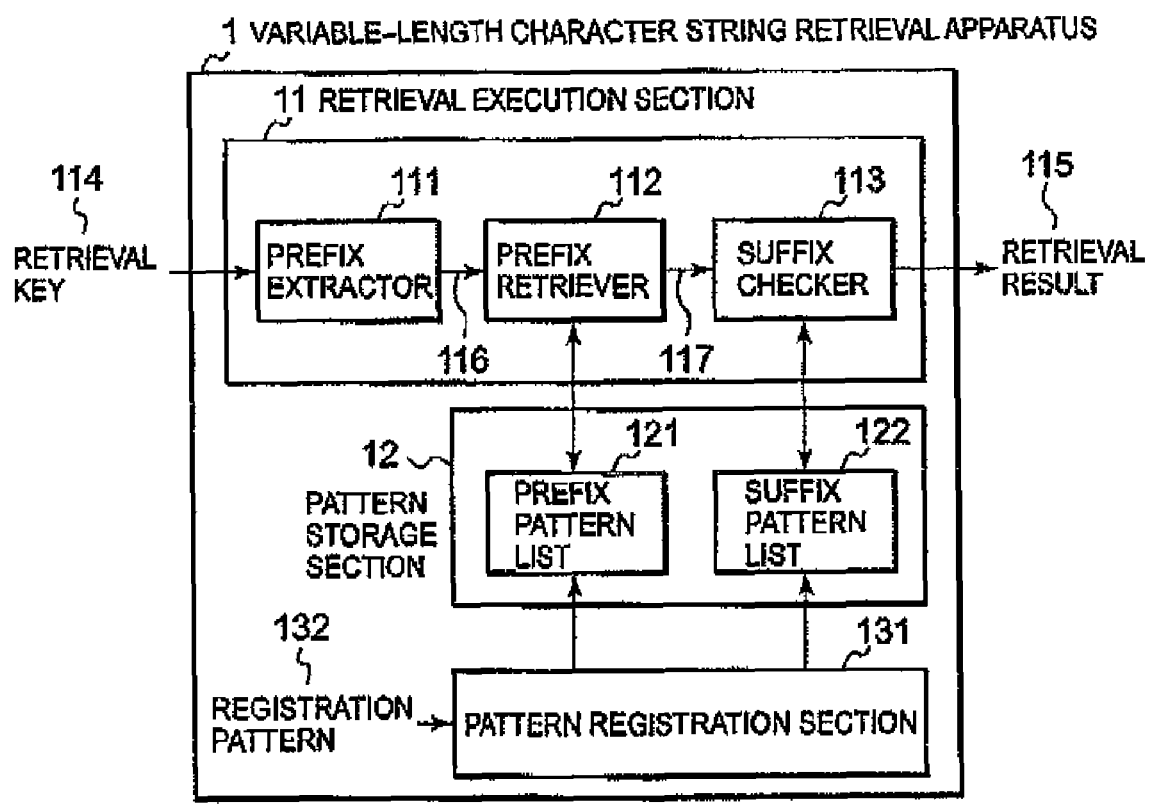
FIG. 2 is a block diagram showing a general configuration of a variable-length character string retrieval apparatus according to a first embodiment of the present invention.

Referring to FIG. 2, a variable-length character string retrieval apparatus 1 according to a first embodiment of the present invention generally includes a pattern registration section 131, a retrieval execution section 11 and a pattern storage section 12.

When a registration pattern 132 is inputted, the pattern registration section 131 extracts N prefixes (N: natural number) with different lengths in accordance with a given extraction rule. Further, the pattern registration section 131 selects one prefix among the extracted prefixes in accordance with a given selection rule, and sets the selected prefix as an index element for the registration pattern 132. Thereafter, a predetermined hash function is applied to the prefix set as the index element to obtain a hash value, and this prefix is registered on a prefix pattern list 121 in the pattern storage section 12, at a location according to the obtained hash value. That is, indexes including individual prefixes as index elements are to be structured on the prefix pattern list 121. On the other hand, a suffix, which is the remaining part of the registration pattern 132 excluding the prefix, is registered on a suffix pattern list 122 in the pattern storage section 12.

Here, a description is given of the extraction rule and the selection rule used in this embodiment. The extraction rule is to extract (create), from a registration pattern, N kinds of prefixes with lengths L1 to LN (L1 to LN: natural number) from the head of the registration pattern. For the lengths of the prefixes to be extracted, any combination of lengths can be employed although they need to be predetermined. As an example of a way to make a combination of lengths, it is possible to employ a method using N kinds of multiples of M, as $Lk=k*M$ (M: natural number, $k=1, 2, \ldots, N$), for example. In this embodiment, it is assumed that this method is employed. The selection rule is to select one prefix among the plurality of prefixes extracted in accordance with the extraction rule. In this embodiment, it is assumed that the longest prefix is selected among the plurality of prefixes extracted in accordance with the extraction rule.

When receiving a retrieval key 114, the retrieval execution section 11 retrieves a registration pattern that matches the retrieval key 114 from the prefix pattern list 121 and the suffix pattern list 122, and outputs a retrieval result 115. The retrieval execution section 11 having such a function includes a prefix extractor 111, a prefix retriever 112 and a suffix checker 113.

The prefix extractor 111 extracts N prefixes from the inputted retrieval key 114 in accordance with the above-described given extraction rule, and outputs the extracted prefixes as prefix information 116 to the prefix retriever 112.

The prefix retriever 112 applies a predetermined hash function to each prefix of the prefix information 116 received from the prefix extractor 111 to obtain a hash value, searches the prefix pattern list 121 based on the obtained hash values, and outputs a prefix-retrieval result 117 to the suffix checker 113.

The suffix checker 113 receives the prefix-retrieval result 117. When a prefix match has been found by the prefix retriever 112 at the previous stage, the suffix checker 113 reads an entry associated with the prefix in question from the suffix pattern list 122, and checks whether or not the suffix (the part other than the prefix) of the retrieval key 114 matches the entry (the suffix of a registration pattern in question). When a match is found, the suffix checker 113 outputs this registration pattern as the retrieval result 115.

Note that the variable-length character string retrieval apparatus 1 having the above-described configuration can be implemented by using a computer. When implementing the variable-length character string retrieval apparatus 1 by using a computer, a program for a variable-length character string retrieval apparatus is stored on a disk, a semiconductor memory or another type of recording medium. The computer is allowed to read the program and control the operations of its own in accordance with the program, whereby the retrieval execution section 11, the pattern storage section 12 and the pattern registration section 131 are implemented on the computer.

1.2) Pattern Registration

A description will be given of operation at the time of registration of a pattern. In the following description, it is assumed to use the extraction rule wherein N=4 and M=4. That is, the extraction rule to extract four kinds of prefixes with lengths of 4, 8, 12, and 16 will be used.

Figure 3:
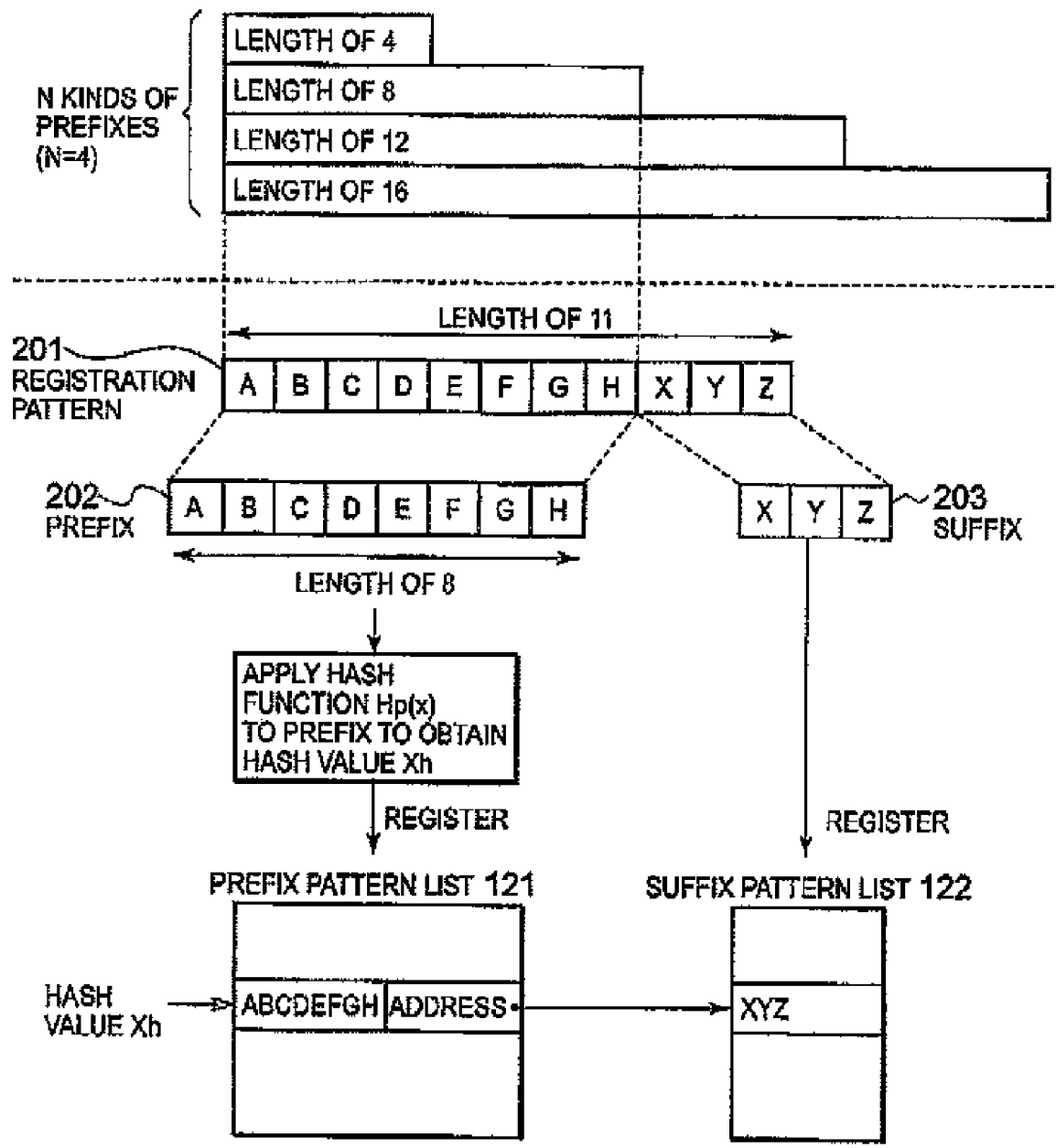
FIG. 3 is a diagram for describing an operation at the time of registration of a pattern, according to the first embodiment.

Now referring to FIGS. 3 and 4, a description will be given of a case where a new registration pattern 201 with a length of 11, "ABCDEFGHXYZ", is inputted to the pattern registration section 131.

Figure 4:
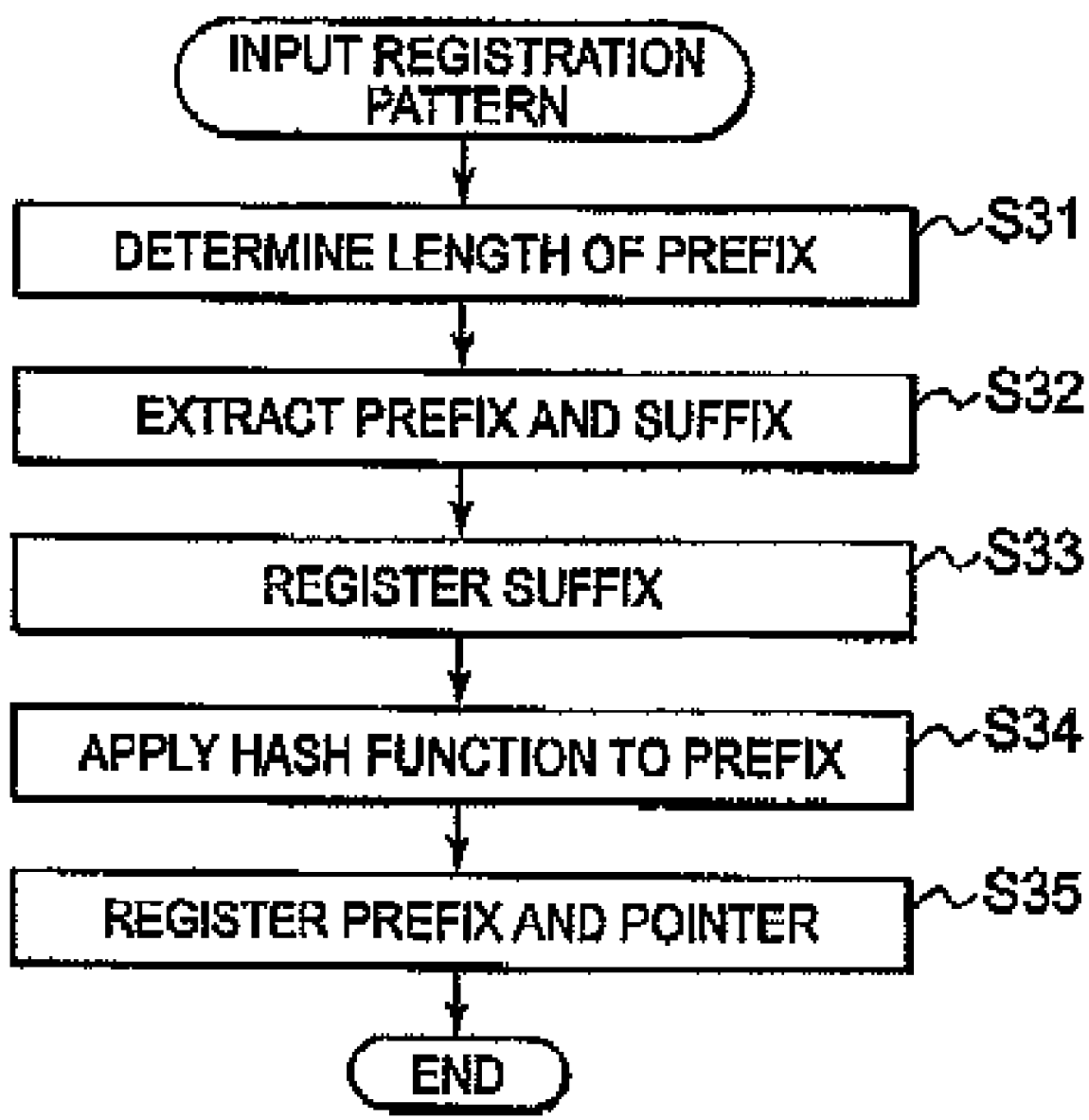
FIG. 4 is a flowchart showing an example of the control operation of a pattern registration section.

When the registration pattern 201 is inputted, the length of a prefix 202 to be set as an index element for the registration pattern 201, is first determined (FIG. 4, S31). For the length of the prefix of the registration pattern, the largest value that is equal to or smaller than the length of the registration pattern 201 is selected in accordance with the selection rule among N kinds of lengths of prefixes extractable in accordance with the extraction rule. In an example shown in FIG. 3, since the four kinds of prefixes have lengths of 4, 8, 12, and 16 and the registration pattern 201 has a length of 11, the length of the prefix 202 of the registration pattern 201 is determined to be eight.

Thereafter, the prefix 202 and a suffix 203 are extracted (FIG. 4, S32). In the example shown in FIG. 3, the prefix 202 is "ABCDEFGH", and the suffix 203 is "XYZ".

Next, the suffix 203 is registered on the suffix pattern list 122 (FIG. 4, S33). Any type of data structure may be employed for the suffix pattern list 122.

Next, a predetermined hash function Hp(x) is applied to the prefix 202 to obtain a hash value Xh (FIG. 4, S34). Finally, the prefix 202 and pointer information indicative of the suffix 203 stored on the suffix pattern list 122 are registered on the prefix pattern list 121, at an address corresponding to the obtained hash value Xh (FIG. 4, S35).

At the step S35, if a prefix and pointer information have been already registered at the address corresponding to the hash value Xh on the prefix pattern list 121, then the following processing is performed, for example. First, an entry on the suffix pattern list 122, indicated by the pointer information, is looked at. When no pointer information indicative of a next entry is registered for the entry of interest, pointer information indicative of the entry made by the registration of the suffix 203 at the step S33 is registered for the entry of interest, and then the process is terminated. If pointer information indicative of a next entry is registered for the entry of interest, the next entry is looked at. Thereafter, similar processing as described above is repeated depending on whether or not any pointer information is registered for the next entry of interest.

If the length of the prefix 202 is equal to that of the registration pattern 201, the entire registration pattern 201 is treated as the prefix, with the suffix having a length of 0. The suffix is registered on the suffix pattern list 122 as a suffix with a length of 0, in the manner as described above. Thus, the pattern registration processing is completed.

1.3) Pattern Retrieval

Figure 5:
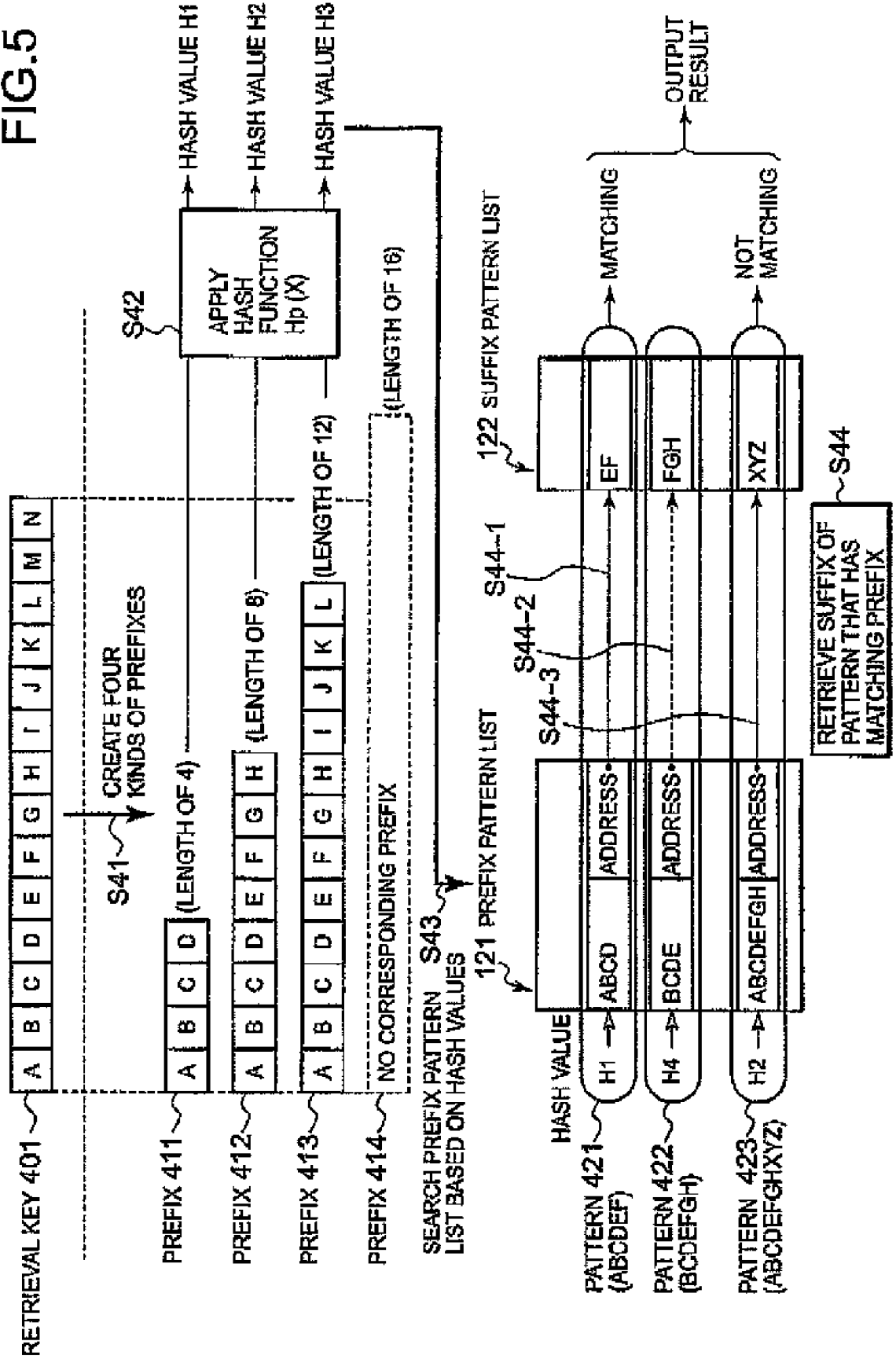
FIG. 5 is a diagram for describing an operation at the time of retrieval, according to the first embodiment.

Now referring to FIG. 5, it is assumed that three registration patterns 421 to 423 ("ABCDEF", "BCDEFGH" and "ABCDEFGHXYZ", respectively) are registered on a pattern list consisting of the prefix pattern list 121 and the suffix pattern list 122. Each of these registration patterns 421 to 423 is stored dividedly on the prefix pattern list 121 and the suffix pattern list 122, in the above-described manner of pattern registration. This pattern list will be searched for a longest prefix match. Specifically, among the registration patterns registered on the pattern list, a registration pattern will be retrieved which is the longest of patterns that are equivalent to partial character strings of a retrieval key 401, "ABCDEFGHIJKLMN", and match prefixes of the retrieval key 401.

A definition of the hash value is given before describing operation at the time of retrieval. With the hash function Hp(x) for calculating a hash value for a prefix, the correlation between the prefix and the hash value is defined as follows: H1=Hp("ABCD"), H2=Hp("ABCDEFGH"), H3=Hp("ABCDEFGHIJKL"), and H4=Hp("BCDE").

When the retrieval key 401, "ABCDEFGHIJKLMN", is inputted, the prefix extractor 111 creates N kinds of prefixes with different lengths from the retrieval key 401 in accordance with the extraction rule (S41). Although all the N kinds of prefixes are to be created basically, a prefix that is longer than the retrieval key 401 is not created. In an example shown in FIG. 5, there are four prefixes with four different lengths to create. Since the inputted retrieval key 401 has a length of 14, however, prefixes 411, 412 and 413 with lengths of 4, 8 and 12, respectively, are created, but a prefix with a length of 16 is not. Information about the created prefixes 411 to 413 with three lengths is given to the prefix retriever 112.

The prefix retriever 112 performs the prefix retrieval in two steps: calculating hash values for the prefixes (S42), and searching the prefix pattern list 121 based on the obtained hash values (S43). At the first step of calculating hash values (S42), the predetermined hash function Hp(x) is applied to each of the prefixes 411 to 413 created by the prefix extractor 111, thereby obtaining a hash value for each prefix. Here, hash values H1 to H3 are obtained for the prefixes 411 to 413, respectively.

Next, based on the obtained hash values H1 to H3, a search on the prefix pattern list 121 is carried out. The prefix of the pattern 421 has been registered at an address indicated by the hash value H1 for the prefix 411, and the retrieval key 401 and the pattern 421 are found to have a prefix match at the stage of prefix retrieval. Similarly, the prefix of the pattern 423 has been registered at an address indicated by the hash value H2 for the prefix 412. However, an entry corresponding to the hash value H3 for the prefix 413 is not registered on the prefix pattern list 121. Accordingly, at the stage of prefix retrieval, candidates for the registration pattern whose prefix matches a prefix of the retrieval key 401 are narrowed to two, namely the registration patterns 421 and 423.

The suffix checker 113 carries out a suffix match check on each registration pattern whose prefix matches a prefix of the retrieval key 401 (S44). Since two candidates for the registration pattern that matches the retrieval key 401, namely the registration patterns 421 and 423, exist at the stage of prefix retrieval, the suffixes of these two registration patterns are checked, which are each indicated by S44-1 and S44-3 in FIG. 5.

In the case of the registration pattern 421, since the length of the matching prefixes of the retrieval key 401 and the registration pattern 421 is four, the suffix of the retrieval key 401 is a character string from the fifth character, "EFGHIJKLMN", and the suffix of the registration pattern 421 is "EF". In the suffixes, the first two characters of the retrieval key 401 and the registration pattern 421 match. As a whole, their first six characters match, which meets the condition of retrieval that a pattern is equivalent to a partial character string of a retrieval key and matches a prefix of the retrieval key. Therefore, the registration pattern 421 matches the retrieval key 401.

On the other hand, in the case of the registration pattern 423, since the length of the matching prefixes of the retrieval key 401 and the registration pattern 423 is eight, the suffix of the retrieval key 401 is a character string from the ninth character, "IJKLMN", and the suffix of the registration pattern 423 is "XYZ". The suffixes of the retrieval key 401 and the registration pattern 423 are apparently different from each other, and therefore the registration pattern 423 does not match the retrieval key 401. Since the registration pattern 421 is found as a pattern that matches the retrieval key 401, the registration pattern 421 is outputted as a retrieval result.

Although only one pattern that matches the retrieval key 401 is found in the foregoing example, a plurality of patterns could be found. For example, when two registration patterns "ABCDEFG" and "ABCDE" have been registered, both the patterns match the retrieval key 401. In this case, based on the definition of the longest prefix match, the longer of the registration patterns that match the retrieval key 401 is selected. Therefore, the registration pattern "ABCDEFG" is selected as a retrieval result.

It is noted that a suffix check is not carried out on the registration pattern 422, which has been already found in the prefix retrieval at step S44 that it does not match the retrieval key 401 (that is, the step indicated by S44-2 is not performed.) In the suffix checking at S44-1 and/or S44-3, if pointer information indicative of a next entry is registered for the entry on which the suffix check is being carried out, a suffix check is also carried out on the next entry indicated by the pointer information. Thus, the pattern retrieval processing is completed.

1.4) Advantages

For indexes, prefixes with N different lengths (N: natural number) are created. At the time of registration of a pattern, the longest of the prefixes with N lengths is adopted as an index element. At the time of retrieval of a pattern, index retrieval is performed using all the N kinds of prefixes. Since a plurality of character strings with different lengths can be registered as indexes, the narrowing of patterns through index retrieval can be performed efficiently. Consequently, it is possible to reduce the costs of the checking processing for comparing the parts other than the prefixes of a retrieval key and of registration patterns.

2. Second Embodiment

In the first embodiment as described above, the prefix extractor 111 extracts prefixes with predetermined N different lengths from a retrieval key, and the pattern registration section 131 extracts a prefix to be set as an index element from a registration pattern based on the predetermined N different lengths. By comparison, in a second embodiment of the present invention, the prefix extractor 111 extracts prefixes with N different lengths according to a predetermined separating character, and the pattern registration section 131 extracts a prefix to be set as an index element from a registration pattern according to the predetermined separating character.

2.1) Prefix Extraction

Figure 6:
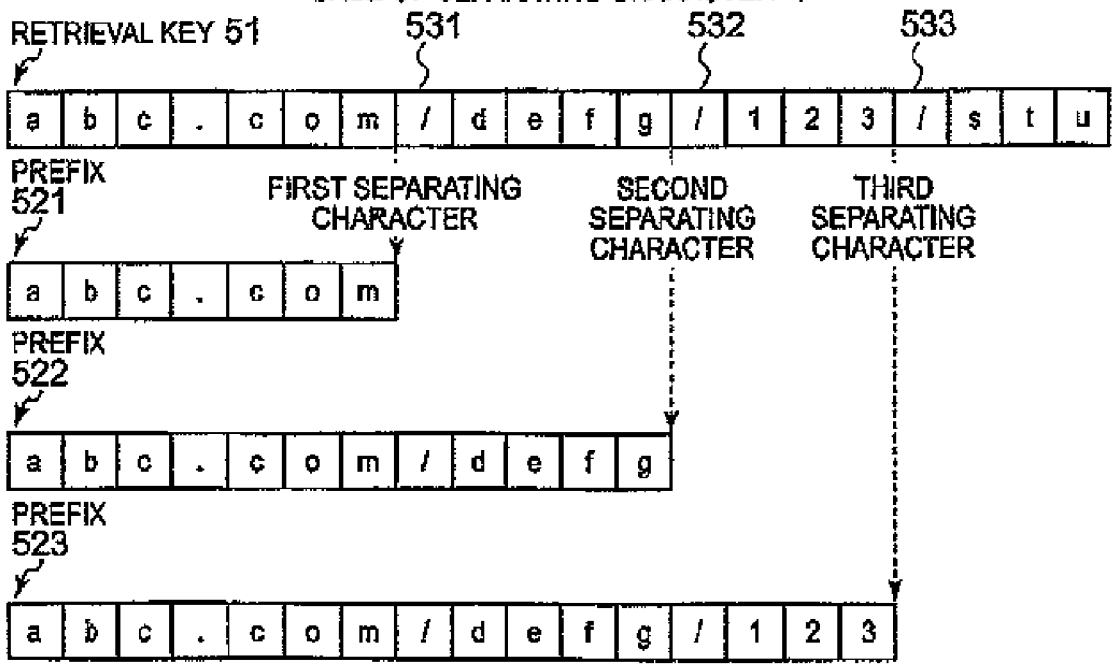
FIG. 6 is a diagram for describing an operation at the time of retrieval, according to a second embodiment of the present invention.
Figure 7:
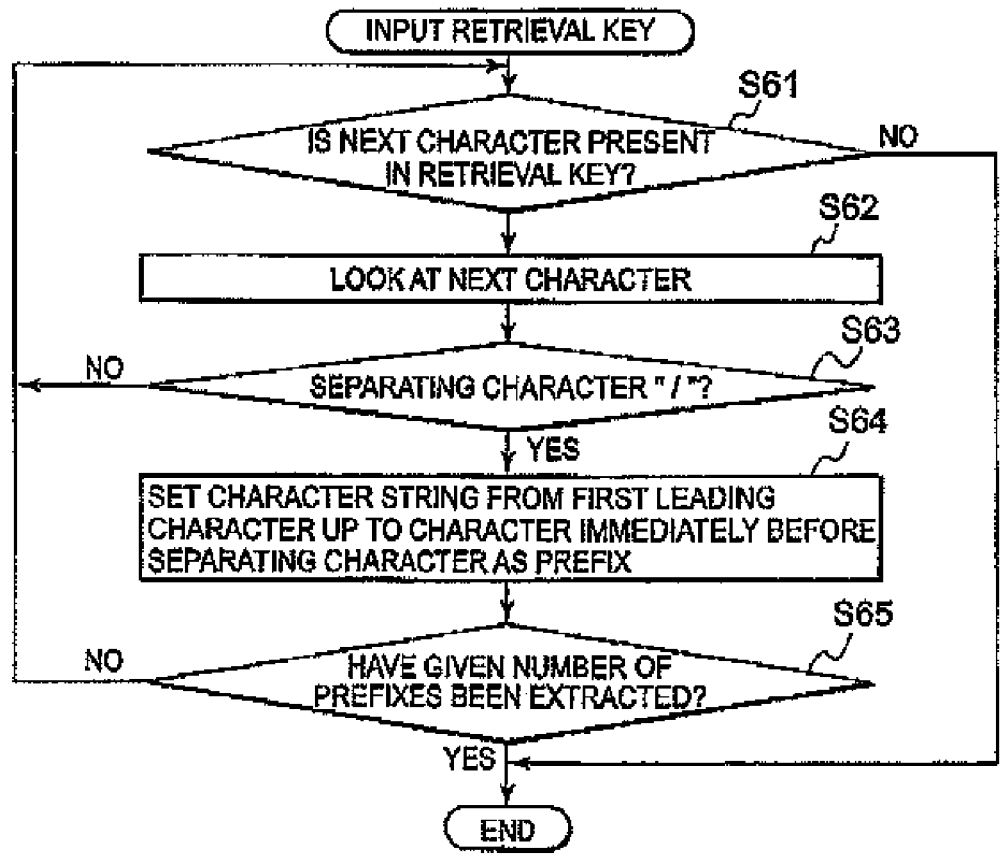
FIG. 7 is a flowchart showing an example of the control operation at the time of retrieval, according to the second embodiment.

First, the operation of the prefix extractor 111 in the second embodiment will be described with reference to FIGS. 6 and 7. In the following description, it is assumed that N=4. In addition, consideration will be given to a case, for example, where a retrieval key 51 as shown in FIG. 6 is inputted, with separating characters "/".

When the retrieval key 51 is inputted, the prefix extractor 111 looks at the first character of the retrieval key 51 and determines whether or not the first character is followed by a next character. When the next character is present (FIG. 7, S61: YES), the prefix extractor 111 looks at the next character (S62). Subsequently, the prefix extractor 111 determines whether or not the character that the prefix extractor 111 is looking at is the separating character "/" (S63).

When the character is not the separating character (S63: NO), the control goes back to the step S61 and the prefix extractor 111 determines whether the character being currently looked at is followed by a next character (S61). When the next character is present (S61: YES), the prefix extractor 111 looks at that next character (S62).

On the other hand, when the character is the separating character (S63: YES), the prefix extractor 111 extracts, as a prefix, from the retrieval key 51, a character string from the first character up to the character immediately before the separating character being currently looked at, and hands the extracted character string over to the prefix retriever 112 (S64). If, however, the character that is being looked at is the first character, the prefix extraction processing is not performed because no character is present before the first character. Thereafter, it is determined whether or not the predetermined number N of prefixes (four prefixes, in this embodiment) has been extracted (S65). When four prefixes have not been extracted yet (S65: NO), the process returns to the step S61. When four prefixes have been extracted (S65: YES), the process is terminated. In addition, the process is also terminated when it is determined at S61 that no next character is present in the retrieval key 51.

In an example shown in FIG. 6, since no separating character is present from the first to seventh characters of the retrieval key 51, the above-described processing from S61 to S63 is repeated until the eighth character, which is a separating character 531, is looked at. When the first separating character 531 is looked at (S63: YES), a character string from "a", the first character, up to "m", the character immediately before the separating character 531, is set as a first prefix 521. Thereafter, similarly, a character string from the first character up to a character immediately before a second separating character 532 is set as a second prefix 522 (S64), and a character string from the first character up to a character immediately before a third separating character 533 is set as a third prefix 523 (S64). Although it is supposed to create four kinds of prefixes, the prefix extractor 111 does not create a fourth prefix because the retrieval key 51 does not contain a fourth separating character (S61: NO). Then, the process is terminated.

2.2) Pattern Registration

Figure 8:
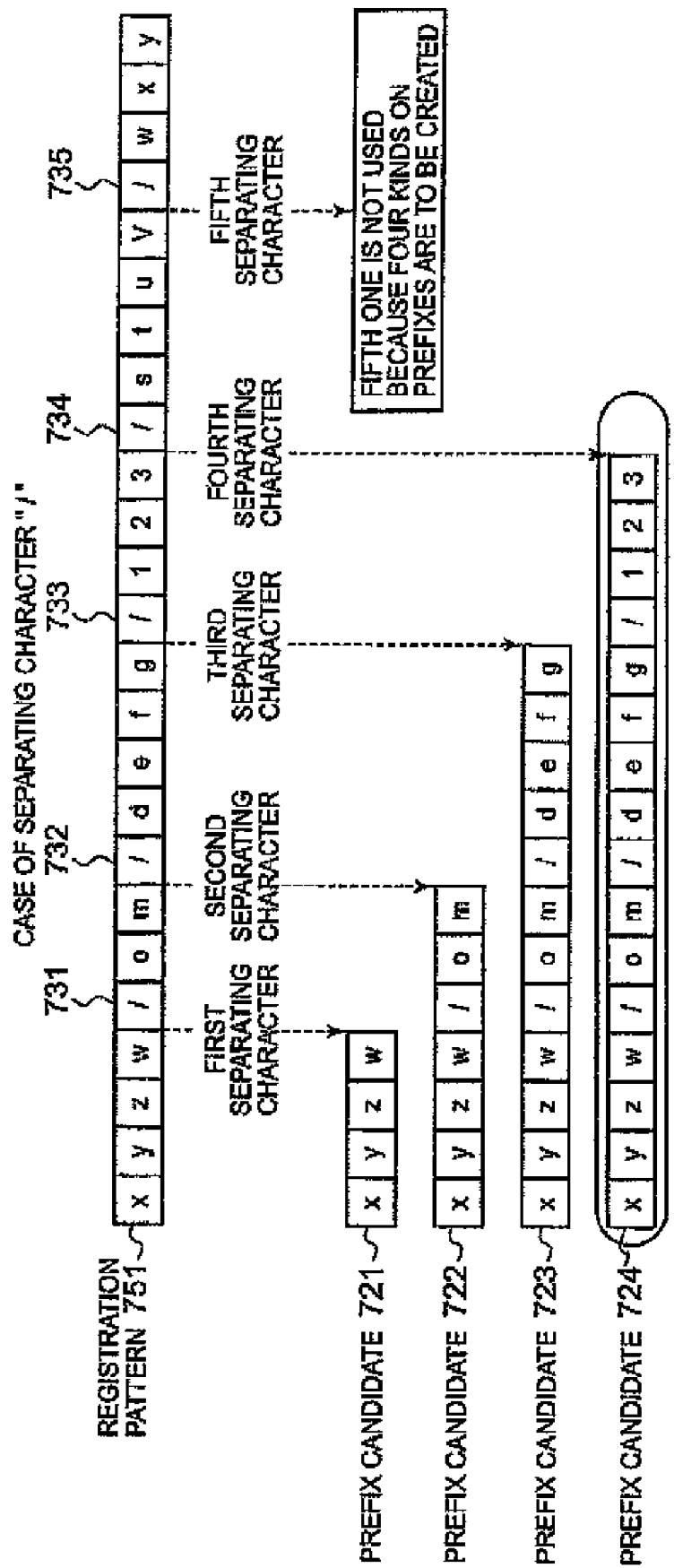
FIG. 8 is a diagram for describing an operation at the time of registration, according to the second embodiment.

Next, the operation of the pattern registration section 131 in the second embodiment will be described with reference to FIGS. 8 and 9. In the following description, it is assumed that N=4. In addition, consideration will be given to a case, for example, where a registration pattern 751 as shown in FIG. 8 is inputted, with separating characters "/".

Figure 9:
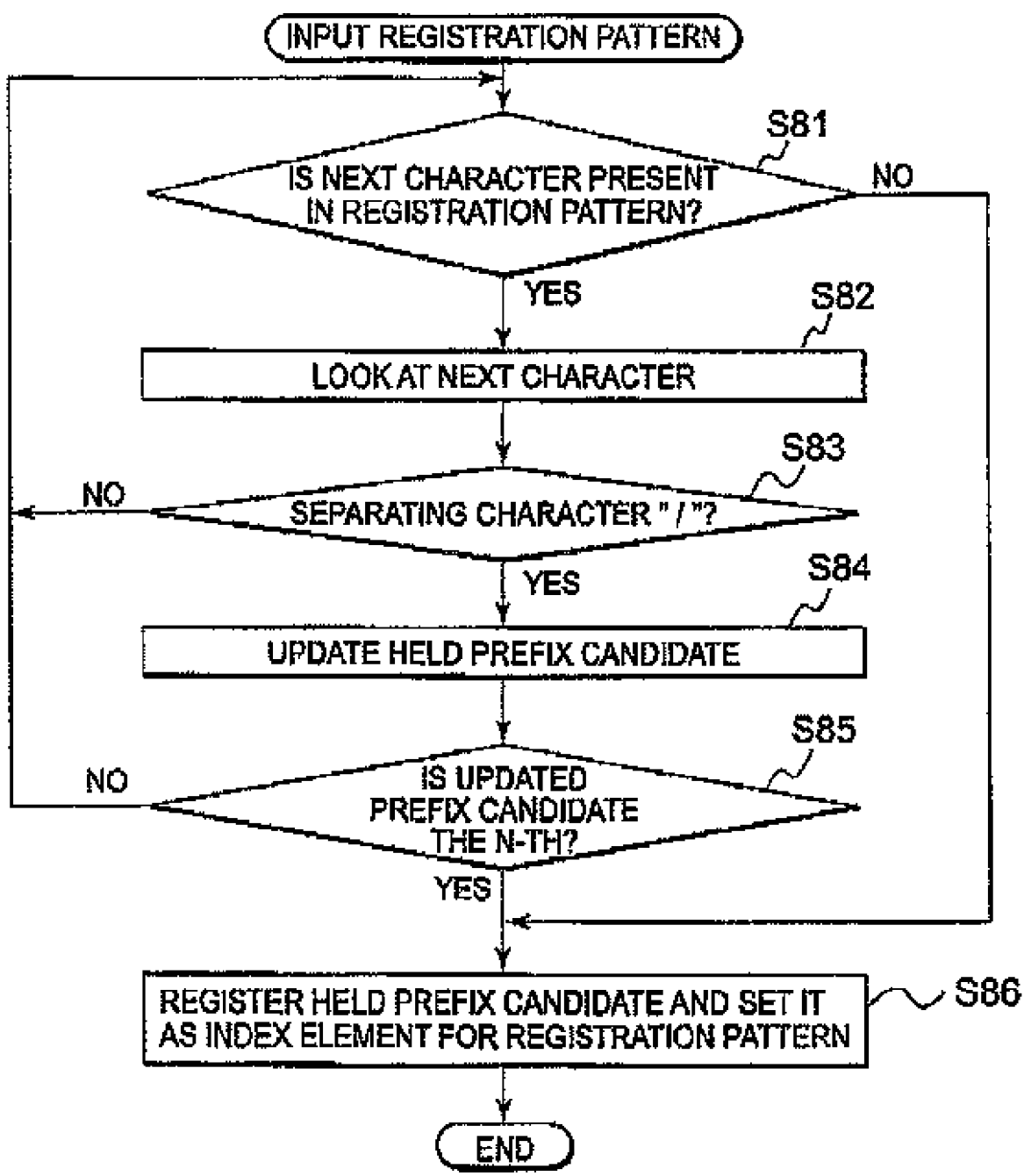
FIG. 9 is a flowchart showing an example of the control operation at the time of registration, according to the second embodiment.

When the registration pattern 751 is inputted, the pattern registration section 131 looks at the first character of the registration pattern 751 and determines whether or not the first character is followed by a next character (FIG. 9, S81). When the next character is present (S81: YES), the pattern registration section 131 looks at the next character (S82). Subsequently, the pattern registration section 131 determines whether or not the character being currently looked at is a separating character "/" (S83).

When the character is not a separating character (S83: NO), the control goes back to the step S81 and the pattern registration section 131 determines whether the character being currently looked at is followed by a next character (S81). When the next character is present (S81: YES), the pattern registration section 131 looks at the next character (S82).

On the other hand, when the character is the separating character (S83: YES), the pattern registration section 131 replaces a prefix candidate, which the pattern registration section 131 is holding, with a character string of the registration pattern 751 from the first character up to the character immediately before the separating character being currently looked at (S84). If, however, the character that is being looked at is the first character, the updating of the prefix candidate is not performed because no character is present before the first leading character.

Subsequently, it is determined whether or not the replacement is performed for an N-th (fourth, in this embodiment) prefix candidate (S85). When the replacement is not made for the fourth prefix candidate (S85: NO), the control goes back to the step S81 and the steps S81-S84 are repeatedly performed while sequentially looking at next characters until the replacement has been performed for the fourth prefix candidate (S85: YES) or no next character is left in the registration pattern 751 (S81: NO).

On the other hand, when the replacement is the fourth prefix candidate (S85: YES), the pattern registration section 131 registers this prefix candidate newly placed at S84 on the prefix pattern list 12, as an index element for the registration pattern 751 (S86). At S86, other processing as described before is also performed, such as registration of the suffix of the registration pattern 751 onto the suffix pattern list 122 and registration of pointer information. It is noted that the processing at S86 is also performed when it is determined at S81 that no next character is present in the registration pattern 751.

In an example shown in FIG. 8, since no separating character is present from the first to fourth characters of the registration pattern 751, the above-described processing from S81 to S83 is repeated. When a first separating character 731 is found (S83: YES), a character string from "x", the first character, up to "w", the character immediately before the separating character 731, is held as a first prefix candidate 721 (S84). Thereafter, when a second separating character 732 is found (S83: YES), the held first prefix candidate 721 is replaced with a character string (second prefix candidate 722) from the first character "x" up to the character immediately before the second separating character 732, namely "m" (S84). Thereafter, similar processing is performed every time a separating character (third separating character 733, fourth separating character 734) is found, to hold a third prefix candidate 723, and then a fourth prefix candidate 724 (S84). When the fourth prefix candidate 724 is held, this prefix candidate is registered on the prefix pattern list 121 as an index element for the registration pattern 751 (S86). Although the registration pattern 751 contains a fifth separating character 735, the fifth separating character 735 is not used as a separating character because N=4.

Figure 10A:
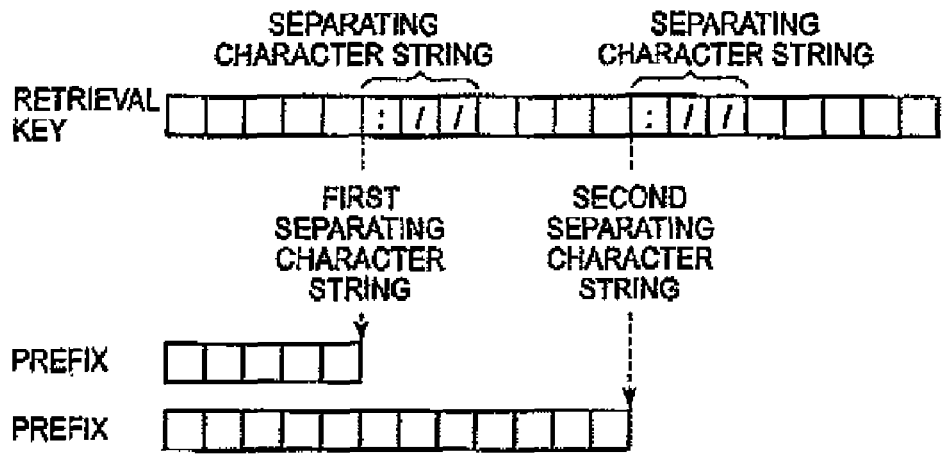
FIGS. 10A to 10C each show variations of the second embodiment.
Figure 10B:
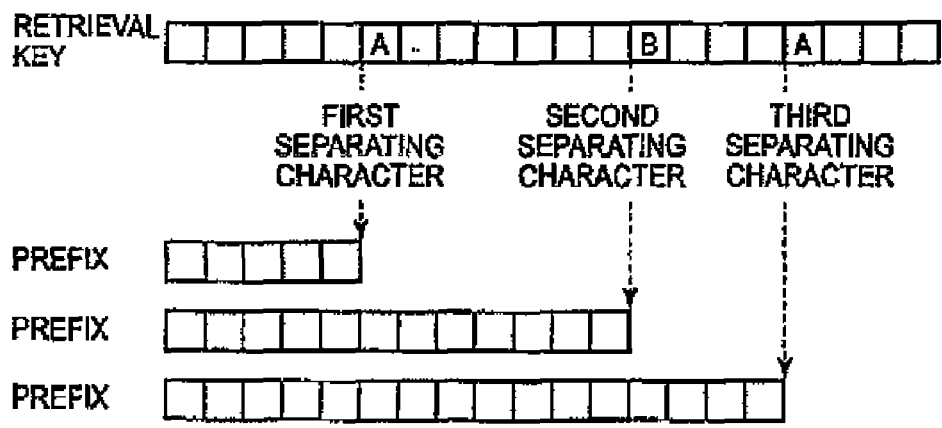
Figure 10C:
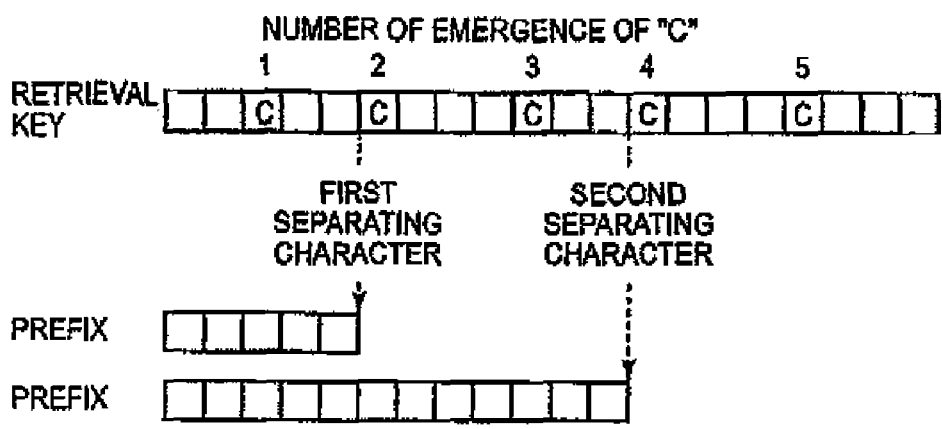

Although "/" is used as an example of separating characters in the above description, no restrictions are placed on the length, position and contents of a separating character. A separating character may have any length as long as the length is at least one. For example, a character string may be composed of a plurality of characters such as "://" shown in FIG. 10A, which can be designated as a separating character. Each of a plurality of different predetermined characters such as "A" and "B" as shown in FIG. 10B, may be designated as a separating character. Moreover, the registration position of a predetermined character may determine whether it is a separating character. As shown in FIG. 10C, it is also possible to designate "C" that emerges for the second and fourth times as a separating character.

The above-described method of determining a prefix based on a separating character (or string) according to the second embodiment is efficient in narrowing patterns based on prefixes when retrieving a pattern characterized by a separating character rather than by the length, such as a URL indicative of the location of a WWW page on the Internet.

3. Third Embodiment

In the first and second embodiments, the retrieval of the longest prefix match of a variable-length character string is performed. By comparison, in a third embodiment of the present invention, the retrieval of a longest suffix match will be performed. Now the third embodiment will be described with reference to FIGS. 11 and 12.

Figure 11:
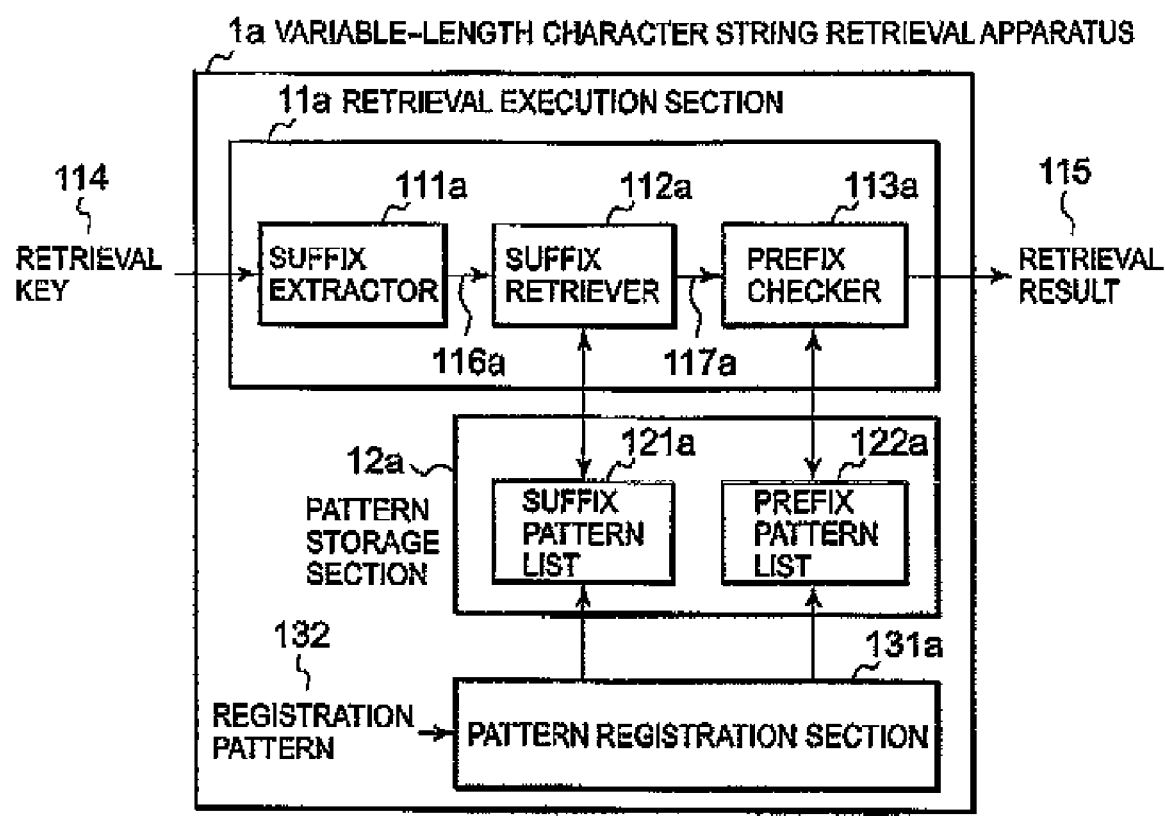
FIG. 11 is a block diagram showing a general configuration of a variable-length character string retrieval apparatus according to a third embodiment of the present invention.

FIG. 11 is a block diagram showing an exemplary configuration of a variable-length character string retrieval apparatus 1a for retrieving a longest suffix match. Referring to FIG. 11, the variable-length character string retrieval apparatus 1a according to the third embodiment generally includes a pattern registration section 131a, a retrieval execution section 11a and a pattern storage section 12a.

When a registration pattern 132 is inputted, the pattern registration section 131a extracts N suffixes (N: natural number) with different lengths from the tail of the registration pattern 132 in accordance with a given extraction rule. Further, the pattern registration section 131a selects the longest of the extracted suffixes in accordance with a selection rule, and sets the selected suffix as an index element for the registration pattern 132. Thereafter, the pattern registration section 131a applies a predetermined hash function to the suffix set as the index element to obtain a hash value, and registers this suffix on a suffix pattern list 121a, at an address corresponding to the obtained hash value. On the other hand, a prefix, which is the remaining part of the registration pattern 132 excluding the suffix, is registered on a prefix pattern list 122a. It is noted that, when the suffix is registered on the suffix pattern list 121a, pointer information indicative of the corresponding prefix is also registered similarly to the embodiments discussed above.

The retrieval execution section 11a includes a suffix extractor 111a, a suffix retriever 112a and a prefix checker 113a.

The suffix extractor 111a extracts N suffixes from a retrieval key 114 inputted, in accordance with the above-mentioned given extraction rule, and outputs the extracted suffixes as suffix information 116a.

The suffix retriever 112a applies a predetermined hash function to each suffix of the suffix information 116a received from the suffix extractor 111a to obtain a hash value. The suffix retriever 112a searches the suffix pattern list 121a based on the obtained hash values and outputs a suffix-retrieval result 117a.

The prefix checker 113a receives the suffix-retrieval result 117a. When a suffix match has been found by the suffix retriever 112a at the previous stage, the prefix checker 113a reads an entry associated with the suffix in question from the prefix pattern list 122a and checks whether or not the prefix (the portion other than the suffix) of the retrieval key 114 matches the entry (the prefix of a registration pattern in question). When a match is found, the prefix checker 113a outputs this registration pattern as a retrieval result 115.

Note that the variable-length character string retrieval apparatus 1a having the above-described configuration can be implemented by using a computer. When implementing the variable-length character string retrieval apparatus 1a by using a computer, a disk, a semiconductor memory or another type of recording medium that stores a program for a variable-length character string retrieval apparatus, is prepared. The computer is allowed to read the program and control the operations of its own in accordance with the program, whereby the retrieval execution section 11a, the pattern storage section 12a and the pattern registration section 131a are implemented on the computer.

Next, a description will be given of operation in the third embodiment with reference to FIG. 12.

In the first and second embodiments, a plurality of prefixes with different lengths are prepared. By comparison, in the third embodiment, as shown in FIG. 12, a plurality of suffixes with different lengths (e.g., 4, 8, 12, and 16) are prepared (S111). Specifically, suffixes 1111 to 1113 are created from a retrieval key 1101 (note that a suffix 1114 with a length of 16 does not exist), and hash values H1 to H3 are calculated for the suffixes 1111 to 1113, respectively (S112). Based on the obtained hash values H1 to H3, the suffix pattern list 121a is searched for a suffix that matches any of the suffixes 1111 to 1113 of the retrieval key 1101 (S113). A check on a prefix stored on the prefix pattern list 122a is carried out only for a registration pattern whose suffix matches any of the suffixes 1111 to 1113. The retrieval of a suffix match can be performed through the foregoing procedures.

As described above, the prefix-related things and the suffix-related things in the first embodiment are reversed in the third embodiment. As for the registration of a pattern, a pattern can be registered as in the manner of registering a pattern shown in the first embodiment, by reversing the prefix-related things and the suffix-related things in the pattern registration method according to the first embodiment.

It should be noted that, although each of the aforementioned embodiments is described by giving the case where the retrieval is performed using a hash function, the retrieval method is not limited to this. It is also possible to employ other methods such as a linear search and a binary tree.

The invention claimed is:

1. An apparatus for retrieving a variable-length string of characters from a plurality of registration patterns, comprising:
    a pattern storage section for storing the plurality of registration patterns and index elements for respective ones of the plurality of registration patterns;
    a pattern registration section for generating an index element for a given registration pattern of the plurality of registration patterns and registering the given registration pattern and the index element for the given registration pattern into the pattern storage section,
        wherein the index element for the given registration pattern is a prefix of the given registration pattern,
        wherein the length of the prefix is a member of a predetermined list of lengths of prefixes which differ from each other, and
        wherein the length of the prefix is the longest member of the list of lengths of prefixes which is not larger than the length of the given registration pattern; and
    a pattern retrieval section comprises:
        a prefix extractor for extracting a plurality of retrieval key prefixes from a given retrieval key, wherein the pattern retrieval section has the predetermined list of lengths which is same as the list of lengths used in the pattern registration section, and wherein lengths of the plurality of retrieval key prefixes are respectively the members of the predetermined list of lengths which are smaller than or equal to the length of the given retrieval key; and
        a prefix retriever for retrieving an index element for the given retrieval key using a plurality of retrieval key prefixes extracted by the prefix extractor to narrow the scope of retrieval.

2. The apparatus according to claim 1, wherein the pattern storage section comprises:
    a prefix pattern list containing registration pattern prefixes of respective ones of the registration patterns, wherein each of the registration pattern prefixes is an index element for a corresponding registration patterns; and
    a suffix pattern list containing suffixes of respective ones of the registration patterns, wherein each of the suffixes is a portion of a corresponding registration pattern excepting its prefix, and
    the pattern retrieval section further comprises a suffix checker for checking whether a suffix of the given retrieval key matches a suffix of the registration retrieved by the prefix retriever in the suffix list.

3. The apparatus according to claim 1, wherein the pattern registration section registers a registration pattern prefix as an index element for each registration pattern at a location corresponding to a hash value obtained by applying a predetermined hash function to the registration pattern prefix, wherein the prefix retriever uses the predetermined hash function to obtain hash values for respective ones of the plurality of retrieval key prefixes and retrieves the prefix pattern list using the hash value obtained.

4. A method for retrieving a variable-length string of characters from a plurality of registration patterns, comprising:
    at a pattern storage section, storing the plurality of registration patterns and index elements for respective ones of the plurality of registration patterns in a pattern storage section;
    at a pattern registration section, generating an index element for a given registration pattern of the plurality of registration patterns and registering the given registration pattern and the index element for the given registration pattern into the pattern storage section,
        wherein the index element for the given registration pattern is a prefix of the given registration pattern,
        wherein the length of the prefix is a member of a predetermined list of lengths of prefixes which differ from each other, and
        wherein the length of the prefix is the longest member of the list of lengths of prefixes which is not larger than the length of the given registration pattern; and
    at a pattern retrieval section having the predetermined list of lengths which is same as the list of lengths used in the pattern registration section,
    extracting a plurality of retrieval key prefixes from a given retrieval key, wherein lengths of the plurality of retrieval key prefixes are respectively the members of the predetermined list of lengths which are smaller than or equal to the length of the given retrieval key; and
    retrieving an index element for the given retrieval key using the plurality of retrieval key prefixes to narrow the scope of retrieval.

5. The method according to claim 4, wherein:
    the pattern storage section includes a prefix pattern list which contains registration pattern prefixes of respective ones of the registration patterns,
    each of the registration pattern prefixes is an index element for a corresponding registration patterns, and a suffix pattern list which contains suffixes of respective ones of the registration patterns,
    each of the suffixes is a portion of a corresponding registration pattern excepting its prefix, and
    the method further comprises at the pattern retrieval section, checking whether a suffix of the given retrieval key matches a suffix of the registration retrieved by the prefix retriever in the suffix list.

6. The method according to claim 4, further comprising:
    at the pattern registration section, registering a registration pattern prefix as an index element for each registration pattern at a location corresponding to a hash value obtained by applying a predetermined hash function to the registration pattern prefix, wherein the prefix retriever uses the predetermined hash function to obtain hash values for respective ones of the plurality of retrieval key prefixes and retrieves the prefix pattern list using the hash value obtained.

7. A computer-readable medium recording a program to instruct a computer to retrieve a variable-length string of characters from a plurality of registration patterns, wherein the program comprises:
  a pattern storage section storing the plurality of registration patterns and index elements for respective ones of the plurality of registration patterns in a pattern storage section;
  a pattern registration section generating an index element for a given registration pattern of the plurality of registration patterns and registering the given registration pattern and the index element for the given registration pattern into the pattern storage section,
    wherein the index element for the given registration pattern is a prefix of the given registration pattern,
    wherein the length of the prefix is a member of a predetermined list of lengths of prefixes which differ from each other, and
    wherein the length of the prefix is the longest member of the list of lengths of prefixes which is not larger than the length of the given registration pattern; and
  a pattern retrieval section which has the predetermined list of lengths which is same as the list of lengths used in the pattern registration section,
    extracting a plurality of retrieval key prefixes from a given retrieval key, wherein lengths of the plurality of retrieval key prefixes are respectively the members of the predetermined list of lengths which are smaller than or equal to the length of the given retrieval key; and
    retrieving an index element for the given retrieval key using the plurality of retrieval key prefixes to narrow the scope of retrieval.

8. The computer-readable medium according to claim 7, wherein:
  the pattern storage section includes a prefix pattern list which contains registration pattern prefixes of respective ones of the registration patterns,
  each of the registration pattern prefixes is an index element for a corresponding registration patterns, and a suffix pattern list which contains suffixes of respective ones of the registration patterns,
  each of the suffixes is a portion of a corresponding registration pattern excepting its prefix, and
  the method further comprises at the pattern retrieval section, checking whether a suffix of the given retrieval key matches a suffix of the registration retrieved by the prefix retriever in the suffix list.

9. The computer-readable medium according to claim 7, wherein the program further comprises: the pattern registration section registering a registration pattern prefix as an index element for each registration pattern at a location corresponding to a hash value obtained by applying a predetermined hash function to the registration pattern prefix, wherein the prefix retriever uses the predetermined hash function to obtain hash values for respective ones of the plurality of retrieval key prefixes and retrieves the prefix pattern list using the hash value obtained.

* * * * *

UNITED STATES PATENT AND TRADEMARK OFFICE
CERTIFICATE OF CORRECTION

| | |
|---|---|
| PATENT NO. | : 8,095,526 B2 |
| APPLICATION NO. | : 12/965602 |
| DATED | : January 10, 2012 |
| INVENTOR(S) | : Akihiro Motoki |

It is certified that error appears in the above-identified patent and that said Letters Patent is hereby corrected as shown below:

In the Specification

Column 1, Line 31: delete ""ABODE"" and insert -- "ABCDE" --

Column 1, Line 38: delete ""BODE"," and insert -- "BCDE", --

Signed and Sealed this
Twenty-sixth Day of August, 2014

Michelle K. Lee
*Deputy Director of the United States Patent and Trademark Office*